INVENTOR
Albert De Mezey
By [signature]
Attorney

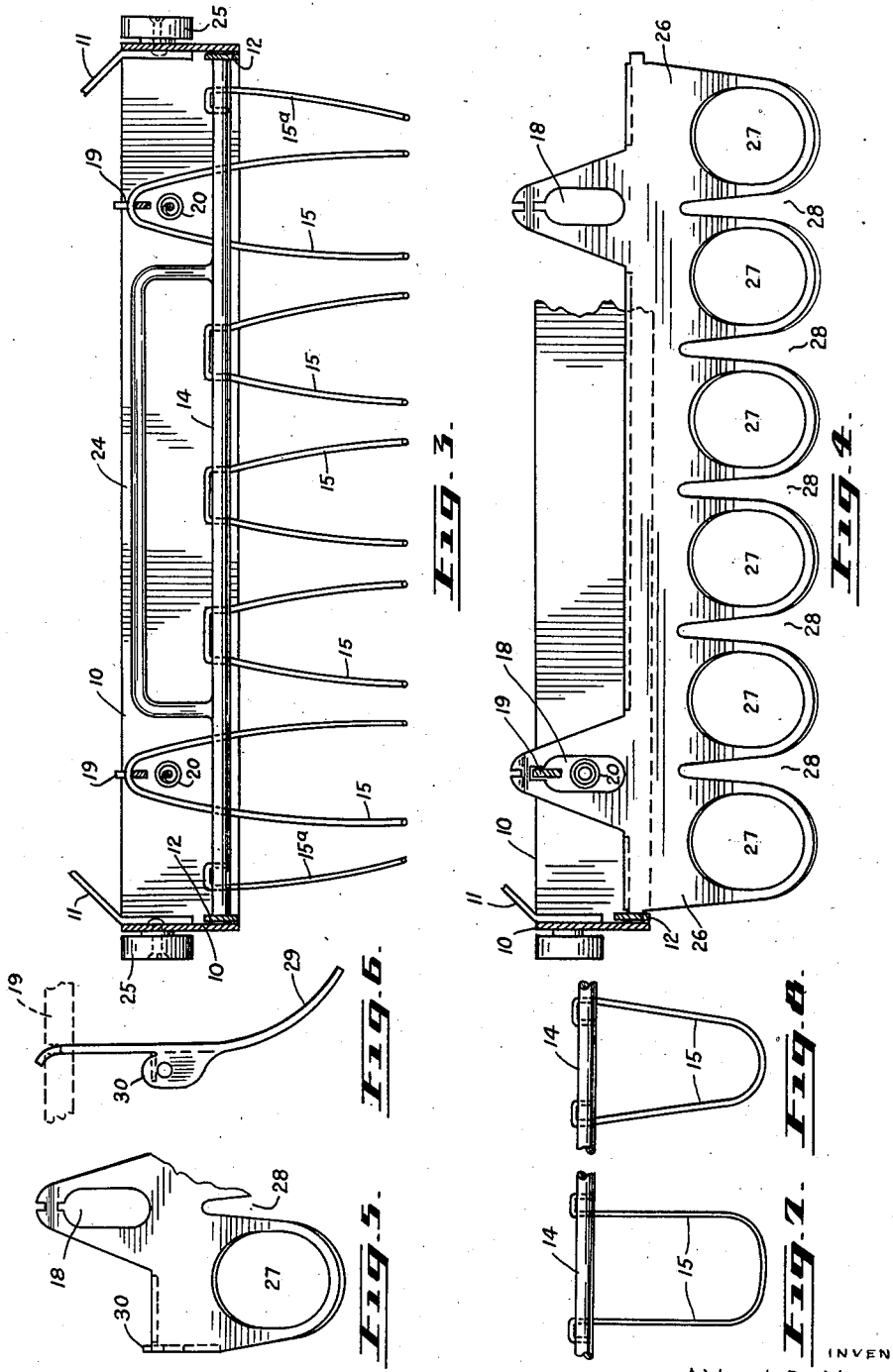

Patented Oct. 31, 1944

2,361,461

UNITED STATES PATENT OFFICE 2,361,461

COMBINATION EGG LIFTING AND TRANSFERRING DEVICE

Albert de Mezey, Edmonton, Alberta, Canada

Application February 15, 1943, Serial No. 475,997

4 Claims. (Cl. 294—87)

This invention relates to egg lifting and transferring devices whereby all the eggs in one layer or tray of an egg crate may be simultaneously picked up from the tray for testing and for dipping and may be replaced simultaneously in the tray. In particular the invention is especially adaptable to the type of tray known as Key's trays for holding eggs in an egg crate.

Egg lifting devices of this character are known in the art, however, they have many objectional characteristics which has resulted in their being generally unacceptable to the trade. Known devices are complicated pieces of mechanism requiring a great number of cooperating components which grip the eggs in jaws tending to crush the eggs which have weak shells. The present invention seeks to overcome these and other objectionable characteristics and generally to provide an efficient, durable and comparatively inexpensive device of the character set forth.

One of the principal objects therefor, is to provide an egg lifting and transferring device adaptable for processing eggs which is extremely simple in construction, having a minimum of fixed and movable parts which act to increase the rigidity and durability of the lifter, and which provide fast drainage of excess oil from the lifter after dipping and which will hold the eggs with a minimum contact area between the eggs and the lifter. The device is constructed with few horizontal surfaces, all parts being disposed edgewise in a vertical plane to the end that excess oil will readily drain off the lifter; in addition I avoid contacting surfaces as much as possible so that each component is spaced from the adjacent components to the end that excess oil is not permitted to lodge in corners, cracks and the like which would be formed had the components not been spaced apart.

Another object of the invention is the provision of an egg lifting device which will scoop the eggs from the tray; the prongs or fingers being disposed beneath the eggs so that the eggs rest on the prongs as they are lifted as opposed to the gripping type of prongs or fingers which clamp against the egg shell and tend to crush those eggs which have weak shells.

With the above noted and other objects in view which may appear as the description proceeds the invention resides in the novel construction, combination and arrangement of cooperating parts as hereinafter more specifically set forth, claimed and shown in the accompanying drawings forming part of this application and in which:

Fig. 3 is a transverse sectional view on the line 3—3 of Fig. 1.

Fig. 4 is a detailed view of a modified form of the egg lifting unit.

Fig. 5 is a fragmentary view of a modified form of one end of Fig. 4, showing a further means of attaching.

Fig. 6 is a side view of Fig. 5.

Figs. 7 and 8, are still further modified forms of the egg lifting units.

Figure 1:
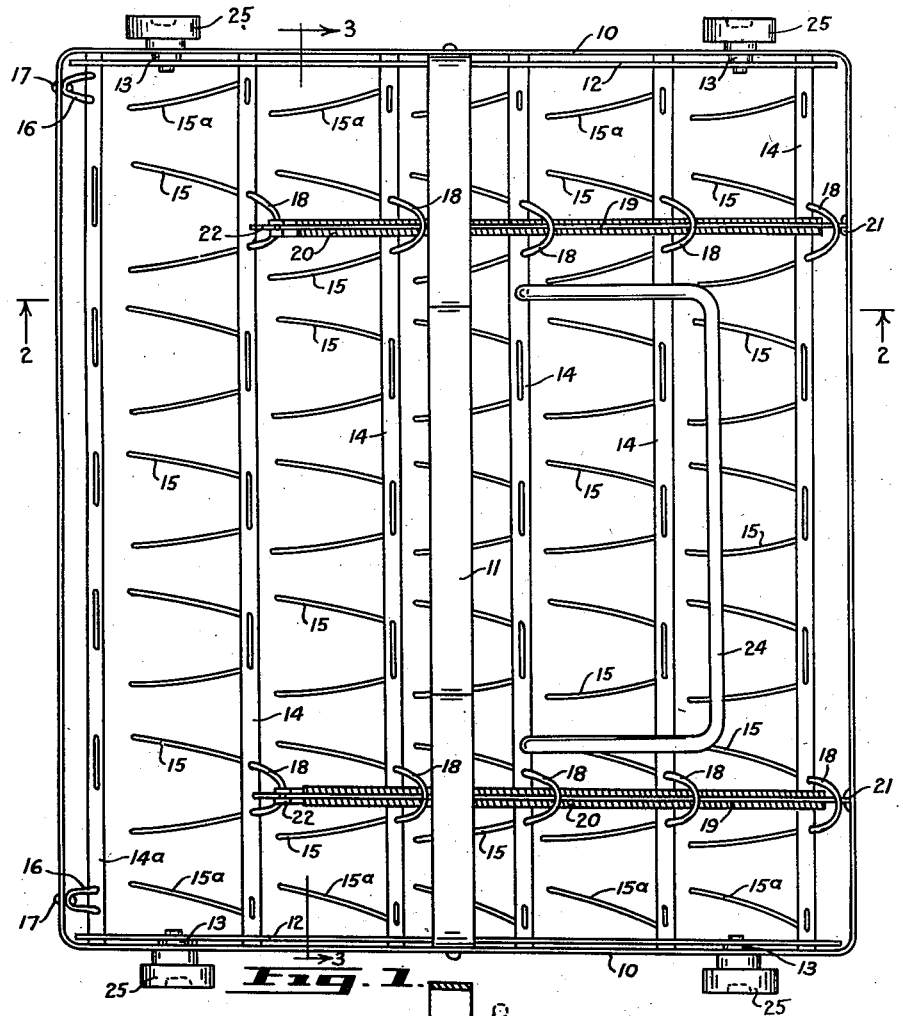
Fig. 1 is a top plan view of my invention.

Referring more in detail to the drawings in which similar reference characters designate corresponding parts throughout the several views it will be seen that the invention resides in a rectangular frame 10, which is disposed edgewise, that is, its depth is in a vertical plane. The frame is provided with a suitable handle 11, disposed lengthwise across the top of the frame and riveted or otherwise secured to the end portions of the frame 10. Bars 12 are secured to the inner lower face of the end portions of the frame 10, in spaced apart relationship to the said end portion of the frame and are securely mounted by rivets or the like having spacers 13, interposed between the said bars and the said frame and portions.

Rock shafts 14, have their extremities rotatably supported in the bars 12. As best seen in Fig. 1, there are six rock shafts, five of which are operatively connected together for partial and simultaneous rotation. The sixth rock shaft 14a, which lies adjacent one side portion of the frame is fixed as and for a purpose to be hereinafter explained in detail.

Figure 2:
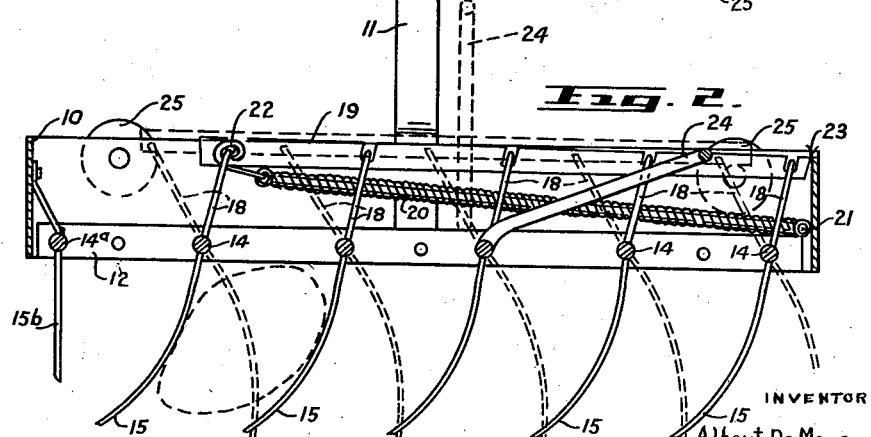
Fig. 2 is a cross sectional view on the line 2—2 of Fig. 1.

The rock shafts 14, carry a plurality of lifting prongs 15, thereon, the said prongs 15, consist of bifurcated, downwardly curved outwardly digressing wire rods which are disposed through pairs of orifices in the rock shafts 14, and are secured thereto by subsequent timing or alternatively they may be spot welded to the rock shafts. The extreme prongs 15a, are secured in the same manner to the rock shafts but consists of a single downwardly curved wire rod. The curvature of the prongs are predetermined, to correspond to the outline of the lower part of an egg and to correspond to the outlines of the conical projections of the egg tray plus allowance for clearance. The shaft 14a, is also provided with prongs 15b, but which are shorter and straight as best seen in Fig. 2, the prongs 15b, serve only to retain the eggs on the adjacent prongs 15. The prongs 15b, are secured to the shaft 14a, in the same manner as hereinbefore described. The extreme prongs being extended upward to form an eye 16, which is looped over a rivet or the like 17, through the side portion of the frame 10, for the purpose of preventing rotation of the shaft 14a.

The outside, bifurcated prongs 15, on each rock shaft 14, are extended as elongated eyes 18, which are secured in interstices in a cooperating link in the form of a strap 19. A coil spring 20, secured at 21, to the side portion of the frame and at 22, to the farthest removed joinder of eye 18, and strap 19, normally urges the prongs to the closed position, this closed position being determined by the length of the strap 19, in that the strap 19, abuts the side portion of the frame 10, as indicated at 23, Fig. 2, by the action of the spring 20.

An operating arm 24, fixed to the intermediate rock shaft 14, at an angle of approximately 45 degrees to the vertical line of the prongs is U-shaped to provide a suitable handle area whereby the operator may grasp the handle 11, and the arm 24, in his outstretched fingers to draw the arm 24, towards the handle.

From the foregoing description of the construction of my invention it will be seen that the rock shafts 14, are cooperatively connected by means of the links 19, and that by means of the operating arm 24, actuated by the hand of the operator the prongs 15, are caused to open or close which is to say are caused in their open position to slide under the eggs in the tray and upon being gradually released to take up a position beneath the eggs whereupon the lifter may be raised from the tray with the eggs held by gravity therein.

When found necessary and for economical constructural purposes the rock shafts 14, may be substituted for my modified form as shown in Fig. 4, which constitutes the lifting unit 26, as a whole being stamped from a flat piece of material thus forming a series of oval shaped openings 27, divided into six or more sections by recesses 28, which permits the partitions of the egg crate to enter, lifting unit 26, is slightly curved to follow the contour of the eggs as will be seen at 29, in Fig. 6, lifting unit 26, may also be attached to support bars 12, or direct to frame 10, by wing hinges 30, as shown in Figs. 5 and 6.

Rollers 25, are supported on the outside face of the end portions of the frame whereby the units can roll along the track of a dip trough or along any suitable tracks which may be erected for conveying the units during egg processing.

It is believed that the construction an advantages of the device may be apparent from the foregoing paragraphs taken in conjunction with the accompanying drawings without further detailed description.

While the preferred embodiment of the invention has been disclosed it is understood that minor changes in the details of construction, combination and arrangement of cooperating parts may be resorted to within the scope of what is claimed without departing from the spirit of the invention.

I claim:

1. An egg lifting device comprising a rectangular supporting frame, a handle secured above said supporting frame, rollers secured exteriorly of said supporting frame, rock shafts rotatably mounted within the confines of the supporting frame, a plurality of egg receiving prongs fixed to said rock shafts, a pair of said prongs on each rock shaft extending above the rock shafts to form upstanding eyes, a pair of coordinating links connected to the upstanding eyes to coordinate the rock shafts for simultaneous movement, an operating lever upstanding from one rock shaft arranged to be actuated by the fingers of the operator while holding the handle of the unit so as to open the prongs and coil springs connected to the links to normally urge the prongs closed.

2. An egg lifting device comprising a frame, a series of rock shafts mounted in said frame in spaced parallel relation, a plurality of egg receiving prongs depending from said shafts at spaced intervals, the prongs of each shaft being curved longitudinally in the same direction and towards the prongs of the next adjacent shaft, and means for rocking said shafts.

3. An egg lifting device comprising a frame, a series of rock shafts mounted in said frame in spaced parallel relation, a plurality of prongs depending from said shafts at spaced intervals, the prongs of each shaft being curved longitudinally in the same direction and towards the prongs of the next adjacent shaft, and a reciprocating lever extending across said shafts and connected therewith for simultaneously rocking said shafts.

4. An egg lifting device comprising a frame, a series of rock shafts mounted in said frame in spaced parallel relation, a plurality of prongs depending from said shafts at spaced intervals, the prongs of each shaft being curved longitudinally in the same direction and towards the prongs of the next adjacent shaft, eyes extending up from said shafts, and a reciprocating lever connected to said eyes adapted to simultaneously rock said shafts upon reciprocation.

ALBERT DE MEZEY.